INVENTORS
THOMAS R. SANTELLI
LEONARD D. SOUBIER
BY
ATTORNEYS

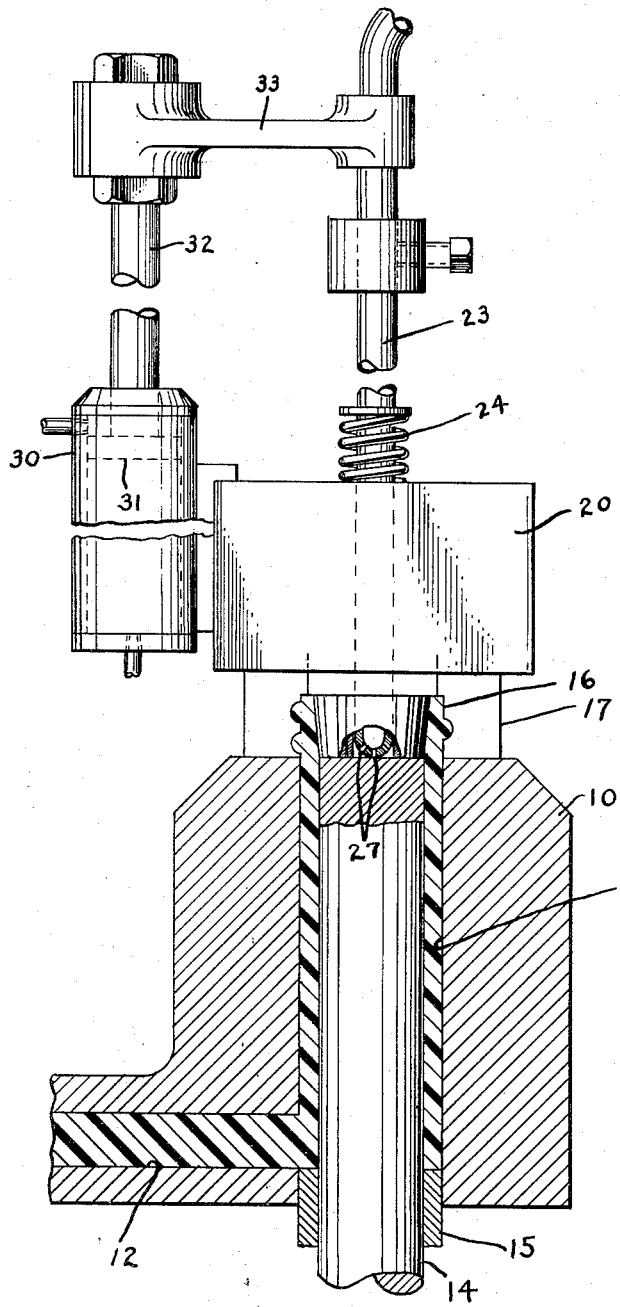

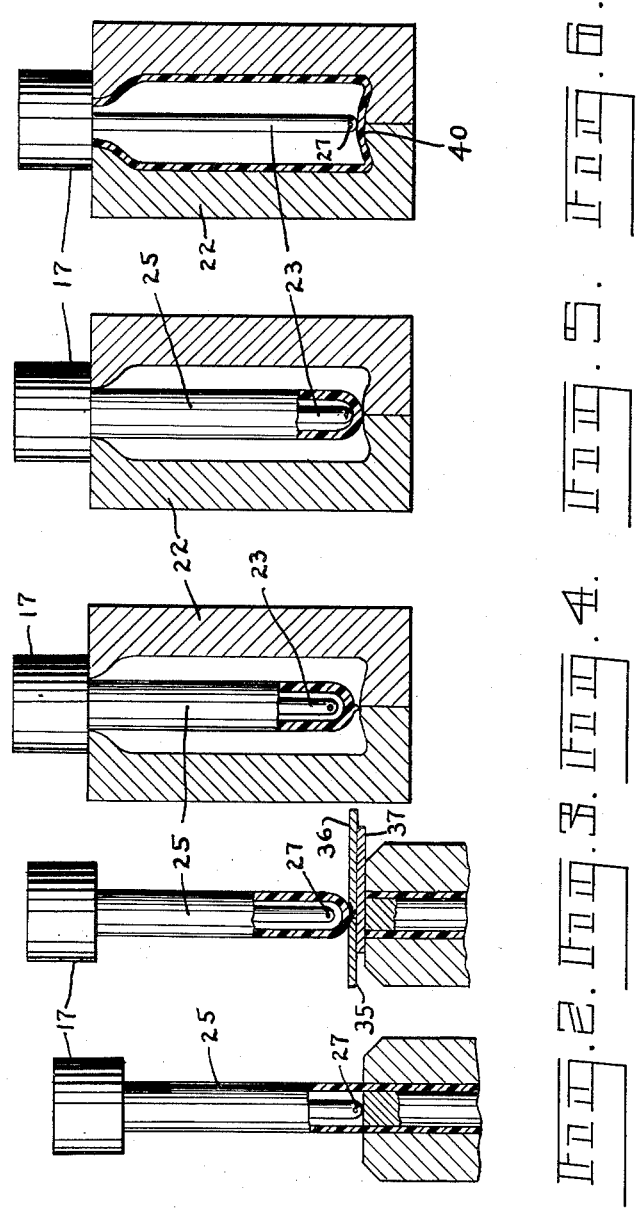

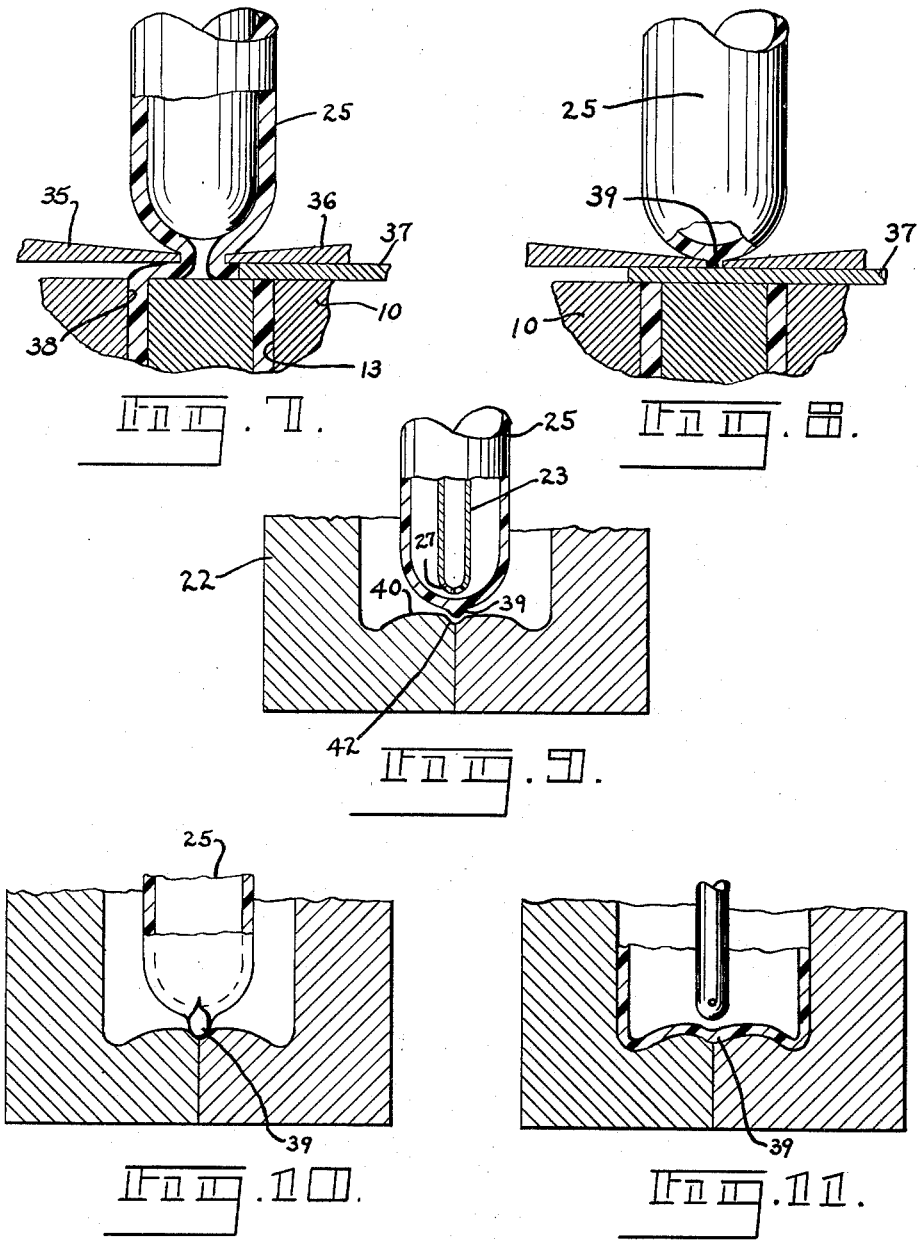

United States Patent Office 3,001,239
Patented Sept. 26, 1961

3,001,239
METHOD FOR BLOWING PARISONS
Thomas R. Santelli and Leonard D. Soubier, Toledo, Ohio, assignors to Owens-Illinois Glass Company, a corporation of Ohio
Filed Nov. 28, 1958, Ser. No. 777,543
5 Claims. (Cl. 18—55)

Our invention relates to the forming of hollow plastic articles and in particular to a method for forming the hollow plastic parisons from which such hollow articles are blown.

In present practice, if a hollow parison is formed and sealed at one end for further expansion into a hollow article, the admission of pressure air for the expansion invariably causes the free lower end of the parison to move off the vertical center line of the blowing mold. This results in a blown article in which the lower portions thereof are of varying cross-sectional thickness. The absence of control of the parison during this expansion, with its resulting unequal wall conditions, means that a high degree of off-ware will result from such procedure.

It is the primary object of this invention to provide a method whereby a hollow sealed parison may be maintained under such control, that it will be located on and remain on the vertical center line of the blow mold, so that when the expansion occurs, the plastic material will be equally disturbed throughout all portions of the walls of the blown article.

It is a further object to provide a method of producing a hollow parison which is ready for final blowing and in which the presence of the unusual excess material is obviated.

This application is a continuation-in-part of an application filed on July 8, 1958, Serial No. 747,182, now abandoned.

It is a further object to provide a type of blowing or expansion of the parison in which the expansion fluid is admitted into the lower sealed end of the parison.

Other modifications will be apparent from the following descriptive matter.

In the drawings:

FIG. 1 is a part-sectional elevational view showing the cooperating extrusion nozzle and neck mold mechanism together with the blowing nozzle and its actuating mechanism;

FIGS. 2 to 6 inclusive are diagrammatic views indicating the steps to be followed in carrying out one form of this invention, namely, that form in which mechanical pressure is utilized to control distribution;

FIG. 7 is an enlarged sectional elevation illustrating the manner of pinching and severing an extruded parison from the extrusion nozzle;

FIG. 8 is also an enlarged sectional elevational view showing the combination of the sealing of the tube and the severing thereof from the extrusion nozzle;

FIG. 9 is a modification in which the lower end of the hollow parison is illustrated as being in alignment with a depression formed between the halves of the blow mold;

FIG. 10 is the next sequence in this method showing the rib-like formation as encompassed in the depression between the halves of the blow mold; and FIG. 11 illustrates the parison as having been expanded and the material formed in the depression by the application of pneumatic pressure.

Figure 15:
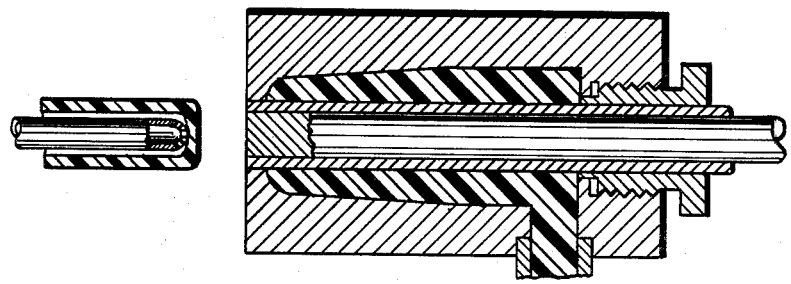
Figure 14:
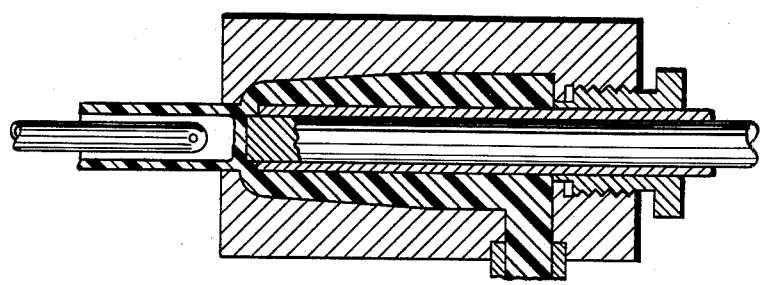

FIGS. 12 to 15 inclusive are diagrammatic views indicating the steps to be taken in carrying out a modified form of this present invention wherein the tubular form as extruded is bottomed within the extruder nozzle and ejected therefrom.

Referring to the drawings, 10 is the usual extrusion nozzle adapted to receive plastic material from a plasticizing mechanism and move it through the opening into a chamber 13 of annular form having a mandrel 14 extending up through the center thereof. A sleeve 15 in the lower end of the annular chamber 13 is adapted for movement to injection mold the material in the neck mold cavity 16 of the neck mold 17 and also to control the passage of plastic material from the passageway 12 into chamber 13. A head 20 carries the neck mold 17 to and from its cooperative position with extrusion nozzle 10 as illustrated in FIGS. 2 to 6 inclusive.

For example, in FIG. 1 the neck mold 17 is positioned on the nozzle and has received molding material and is ready to be moved away from the nozzle. In FIG. 2 the neck mold 17 is shown about to reach its uppermost position while in FIG. 3 it has reached its uppermost position and the extruded tubular parison 25 has been severed and sealed by the shearing and sealing mechanism 20. The sealed parisons 25 will be shorter than the finally blown or finished article. In FIG. 4 the neck mold 17 is shown in juxtaposed relation with the blow mold 22 and with the blowing nozzle 23 positioned in its uppermost position where it is normally retained by a spring 24. In FIG. 5 the nozzle 23 is shown in its lowermost position pinching the bottom end of the parison 25 between the end of the nozzle 23 and the bottom of the blow mold 22. This relative positioning of the nozzle 23 with respect to the parison 25 is obtained and maintained by the cylinder 30 until the completion of the blowing operation as illustrated in FIG. 6. The centering operation may also be accomplished by permitting the blowing or expansion fluid to issue under pressure from the openings 27 formed in the end of the blow tube 23 to push the elongated portion 39 downwardly into the slot 42 formed between the mold halves 22, as illustrated in FIGS. 9–11, discussed hereinafter.

The raising and lowering of the blowing nozzle 23 is accomplished by means of the air motor 30, the piston 31 and its accompanying piston rod 32. A supporting bracket 33 interconnects the piston rod 32 and the blowing air nozzle 23. The actuation of the nozzle 23 in its raising and lowering movements may be timed in sequence to the other forming operations by any ordinary form of timing mechanism (not shown) such as an Eagle Multiflex Timer, manufactured by the Eagle Signal Corporation of Moline, Illinois.

The forming of the hollow parison 25 requires after it has been extruded from the nozzle 10 that it be sealed and severed from the nozzle orifice 38. One manner in which this may be accomplished is by having two opposed pinching or sealing members 35 and 36 moving toward each other and arranged to meet approximately on the center line of the opening of the annular chamber 13 and thereby pinching the walls of the extruded hollow tube therebetween. Concurrently with this pinching a sear member 37, positioned between the members 35 and 36 and the nozzle 10, is arranged to move completely across the annular opening 38, severing the extruded material from that contained in the annular chamber 13 and at the same time also severing the material between the top of the extrusion nozzle 10 and the bottom surface areas of the pinching members 35 and 36. This will leave the hollow parison with a sealed and trimmed end and having an elongated sealed formation 39 extending across a portion of its width and on the center line thereof.

The sealing and shearing of the parison 25 from the extrusion nozzle 10 may be accomplished while the neck mold 17 is still moving toward its uppermost position or it may be accomplished just as the neck mold reaches its uppermost position.

With the completion of the severing and sealing action, the neck mold 17 and its attached parison 25 may be moved to a position to be enclosed by the blow molds 22 and the parison 25 may then be expanded to final form as shown in FIG. 6.

In the form illustrated in FIGS. 2 to 6 inclusive, the end of the sealed parison formation 25 will, after the closing of the finish mold 22, be disposed between the lower end of the blowing nozzle 23 and the upper surface areas of the bottom 40 of the blow molds 22 and will be clamped therebetween by the pressure applied to the blowing nozzle 23 from the cylinder 30 under a timer control. The pressure from cylinder 30 will overcome the resistance of the spring 24 and maintain the clamping action until such time as the timing mechanism relieves the pressure on piston 31.

In the form or modification in FIGS. 9 to 11 inclusive, the elongated sealed portion 39 is adapted to be enclosed by a depression 42 formed in and on the split center line of the inside bottom surface 40 of the halves of the blow molds 22 such as illustrated in FIGS. 9 and 10. Thus when air under pressure issues from the orifice openings 27 in the blowing nozzle 23, the parison 25 is already restrained from movement and held against the bottom 40 of the blow mold, and on the center line of the molds, due to the fact that the rib formation 39 will be retained in the depression 42 by this pressure application. In addition, the member 23 may also be actuated to aid and assist in maintaining the parison on the center line of the mold prior to and during the expansion thereof. The blowing air is then admitted to expand the parison to final form and the material will be equally distributed through the walls in the blown article.

A further modification of the basic method is shown in FIGS. 12 to 15 inclusive wherein a transverse wall or bottom is formed on the end of the length of tubing during its extrusion from the orifice of an extruder.

Figure 13:
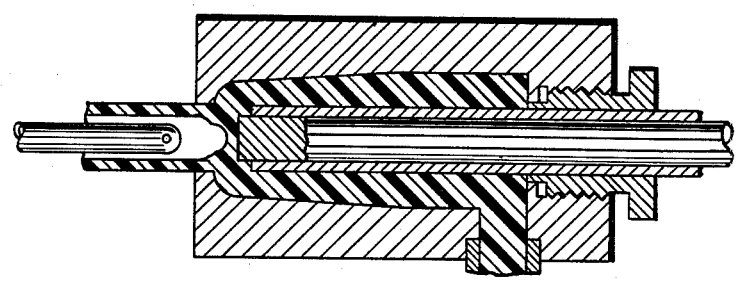
Figure 12:
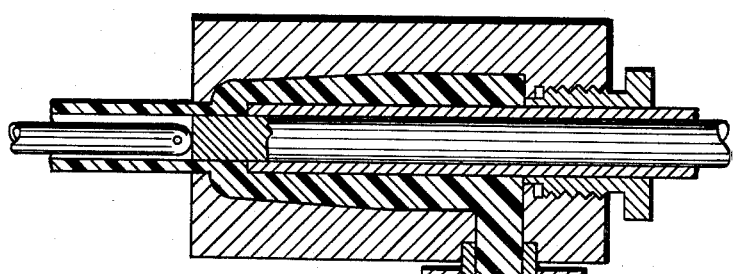

Referring to FIG. 12 the mandrel 14 is in its position within the orifice 38 and a hollow tubular form of plastic material is being extruded integral with a previously formed neck portion under the pressure supplied by the usual form of extruder. In FIG. 13 the mandrel is shown retracted below the inner edge of the orifice opening and within the cavity, thereby permitting the plastic material to flow under the extruder pressure over and around the top end of the mandrel, thereby forming a transverse solid portion at the end of the previously extruded length of tubing. Thereafter the mandrel 14 will move upwardly at the same rate of movement as the material which is being extruded from the orifice 38, thereby forming a bottom for the extruding tube as in FIG. 14. At this time the sleeve 15 also starts its upward movement and the timing of the movement thereof is such that the upper end of the sleeve and the top surface of the mandrel 14 will reach the horizontal plane of the inner edge of the orifice 38 at the same time. As they simultaneously move upwardly, thereby continuing the extrusion of the plastic material, the extrusion will be concurrently severed at the inner edge of the orifice 38 and the tube will be sealed and bottomed as is illustrated in FIG. 15.

The neck mold 17 with its closed parison 25 will continue its upward movement and at this time the nozzle 23 will come into approximate contact with the inner surface of the bottomed tube or parison 25. The blow molds 22 will then close around this parison 25 and the nozzle 23 will be moved downwardly by the cylinder 30, thereby pinching the bottom of the parison 25 between the lower end of the nozzle 23 and the upper inner surface of the mold bottom 40. This action will clamp the parison on dead center or in alignment with the vertical axis of the blowing mold and immediately thereafter blowing air will be admitted through the nozzle 23 and its openings 27 to expand the parison to final form as shown in FIG. 6.

From the preceding it should be apparent that the application of either pneumatic or mechanical pressure can be utilized in controlling the distribution of the plastic material in the walls of a blown hollow article.

Modifications may be resorted to within the spirit and scope of the appended claims.

We claim:

1. In a method for making a plastic container by blow molding which includes forming an elongated unconfined hollow parison body portion in a condition of plasticity conductive to further working, thereafter sealing one end of said parison, and then completely enclosing said sealed parison body in a completely closed blow mold and in alignment with the center line of the blow mold, and blowing said parison body portion to conformance with the shape of the blow mold, the improvement which comprises positively pressing the said sealed end of said parison, by pressure exerted internally of said parison, against the adjacent end of said closed blow mold before blowing said body portion to conformance with the shape of said blow mold, thereby to positively prevent the parison from moving off center during the blowing operation while at the same time producing a blown plastic container having no flash on its sealed end.

2. An mprovement according to claim 5 wherein said step of positively pressing is accomplished by mechanical pressure means locally exerted against the closed end of said parison.

3. An improvement according to claim 5 wherein said step of positively pressing is accomplished by pneumatic pressure.

4. An improvement according to claim 1 wherein said sealed parison has an elongated rib-like portion on its sealed end and wherein said closed mold has a matching elongated rib-like depression, and when said sealed parison is enclosed in said blow mold, said rib-like depression is in matching alignment with said elongated rib-like portion of said sealed end of said parison, and wherein said pressing step presses said rib-like portion firmly into said rib-like depression.

5. The method of blow molding a hollow tubular parison formed by extrusion of heated thermoplastic material comprising the steps of: closing one end of said parison, then enclosing the closed end portion of said parison within a blow mold, positively pressing said closed end of said parison against the adjacent end face of said blow mold by pressure exerted internally of the parison, thereby positioning said parison relative to said blow mold, and expanding the mold enclosed portion of said parison to conform to said blow mold while continuing the pressing of said closed end of the parison against the adjacent end face of the blow mold.

References Cited in the file of this patent

UNITED STATES PATENTS

| 2,789,313 | Knowles | Apr. 23, 1957 |
| 2,810,934 | Bailey | Oct. 29, 1957 |
| 2,861,295 | Hagen et al. | Nov. 25, 1958 |

FOREIGN PATENTS

| 154,343 | Australia | Nov. 27, 1953 |
| 1,046,602 | France | July 15, 1953 |
| 1,114,897 | France | Dec. 26, 1955 |
| 692,590 | Great Britain | June 10, 1953 |

UNITED STATES PATENT OFFICE
CERTIFICATE OF CORRECTION

Patent No. 3,001,239                          September 26, 1961

Thomas R. Santelli et al.

It is hereby certified that error appears in the above numbered patent requiring correction and that the said Letters Patent should read as corrected below.

Column 1, line 29, for "disturbed" read -- distributed --; line 33, for "unusual" read -- usual --; column 2, line 57, for "sear" read -- shear --; column 4, line 17, for "conductive" read -- conducive --; line 31, for "mprovement" read -- improvement --.

Signed and sealed this 20th day of February 1962.

(SEAL)
Attest:

ERNEST W. SWIDER
Attesting Officer

DAVID L. LADD
Commissioner of Patents